United States Patent
Calhoun

[15] 3,645,136
[45] Feb. 29, 1972

[54] FLUID PRESSURE MEASURING DEVICE

[72] Inventor: Charles W. Calhoun, 1502 West 34th, Houston, Tex. 79405

[22] Filed: Apr. 15, 1970

[21] Appl. No.: 28,802

[52] U.S. Cl.....................................73/393, 73/398 AR
[51] Int. Cl.................................G01l 19/04, G01l 9/04
[58] Field of Search...........73/398 AR, 141 A, 393; 338/4

[56] References Cited

UNITED STATES PATENTS

| | | | |
|---|---|---|---|
| 3,046,788 | 7/1962 | Laimins | 73/398 AR |
| 2,933,707 | 4/1960 | Blystone et al. | 73/398 AR X |
| 2,420,148 | 5/1947 | Ostergren | 338/4 UX |
| 3,128,628 | 4/1964 | Lebow | 73/398 AR |

Primary Examiner—Donald O. Woodiel
Attorney—Jack W. Hayden

[57] ABSTRACT

A metal piece is provided with a body portion having a center passageway extending from one end thereof to a point short of the opposite end thereof, such body portion having two flat parallel sides lying parallel to the center axis of the passageway. A pair of resistance strain gages are bonded to each of the two flat sides above the passageway. One strain gage on each flat side is oriented to measure transverse strain and the other is oriented to measure axial strain. The four strain gages are connected to form a Wheatstone bridge, the transverse strain gages causing the bridge to provide an indication of fluid pressure within the passageway and the axial strain gages providing temperature compensation for the bridge.

4 Claims, 4 Drawing Figures

PATENTED FEB 29 1972 3,645,136
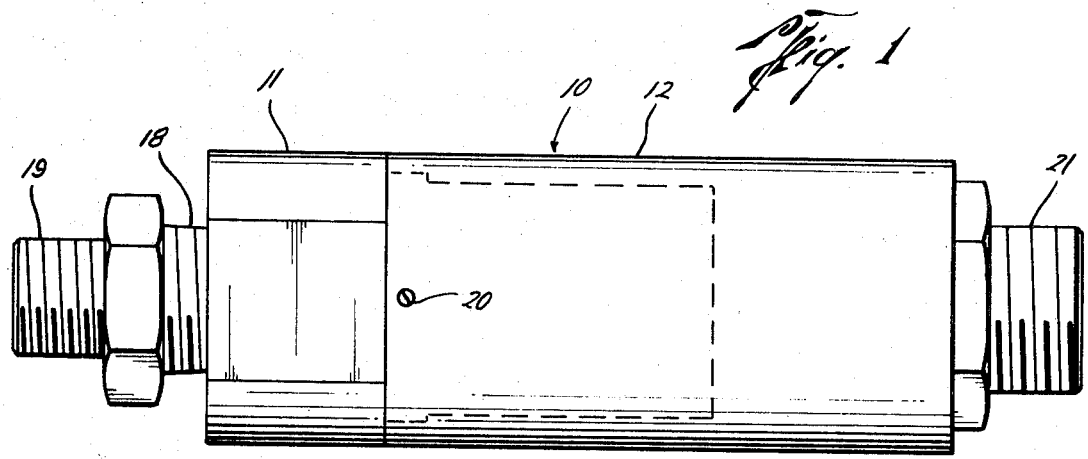
Fig. 1
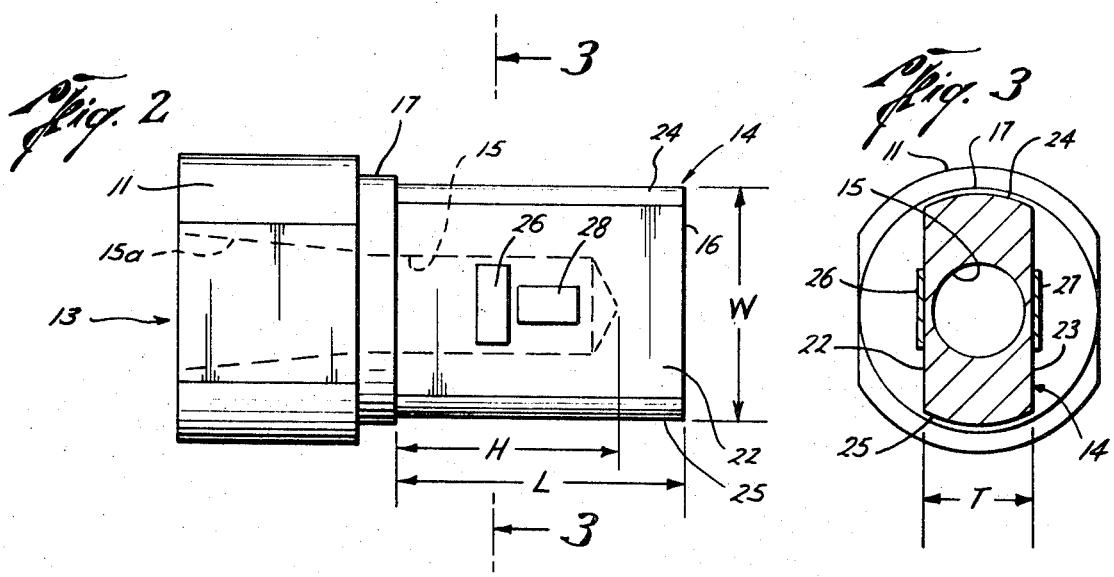
Fig. 2
Fig. 3
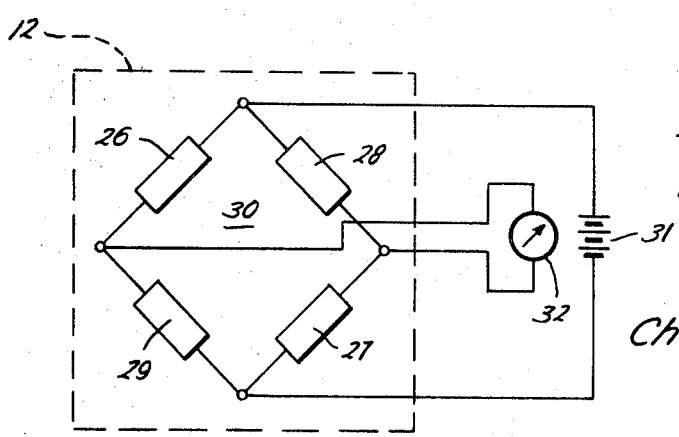
Fig. 4
Charles W. Calhoun
INVENTOR
BY Jack W. Hayden
&
Richard E. Bee
ATTORNEYS

FLUID PRESSURE MEASURING DEVICE

BACKGROUND OF THE INVENTION

This invention relates to fluid pressure measuring devices.

Various and sundry types of fluid pressure measuring devices are presently available. They suffer from various limitations and disadvantages. Many of them are subject to permanent damage if they are overloaded much beyond their normal operating range. This is an undesirable feature where the device is used in an application wherein occasional high pressure surges may occur. Many of the presently available pressure measuring devices do not have very satisfactory temperature stability characteristics The readings obtained with such devices change as the temperature changes, even though the fluid pressure remains the same. Some of the available devices are not very sensitive and require the use of signal amplifiers in order to achieve a usable output signal level. The scale calibrations of some of the presently available devices do not possess a very high degree of linearity. This complicates the determination of the pressure values from the output signal values, or, where the nonlinearity is ignored, leads to errors in the pressure values.

SUMMARY OF THE INVENTION

It is an object of the invention, therefore, to provide a new and improved fluid pressure measuring device having a high degree of linearity and extremely good temperature stability characteristics over its intended operating range.

It is another object of the invention to provide a new and improved and very rugged pressure measuring device which is particularly suitable for measuring relatively high pressures and which is capable of withstanding substantial overloads without damage.

In accordance with the invention, a fluid pressure measuring device comprises a metal piece having a body portion having a center passageway extending from one end thereof, such body portion having two flat parallel sides lying parallel to the center axis of the passageway. The pressure measuring device also includes a first strain gage bonded to one of the flat sides above the passageway for measuring the strain in a plane transverse to the center axis of the passageway. The pressure-measuring device further includes a second strain gage bonded to one of the flat sides above the passageway for measuring the strain in a plane parallel to the center axis of the passageway. The pressure-measuring device additionally includes circuit means for enabling the strain gages to be connected in circuit with one another whereby the first strain gage may provide an indication of the fluid pressure within the passageway and the second strain gage may provide temperature compensation for the device.

For a better understanding of the present invention, together with other and further objects and features thereof, reference is had to the following description taken in connection with the accompanying drawing, the scope of the invention being pointed out in the appended claims.

BRIEF DESCRIPTION OF THE DRAWING

Referring to the drawing:

FIG. 1 is an elevational view of the fluid pressure measuring device constructed in accordance with the present invention;

FIG. 2 is an elevational view of a pressure-sensing element of the FIG. 1 device, as seen when a protective case is removed;

FIG. 3 is a cross-sectional view taken along section line 3—3 of FIG. 2; and

FIG. 4 shows the electrical circuit of the FIG. 1 device, together with typical external elements which may be used when making measurements.

DESCRIPTION OF THE PREFERRED EMBODIMENT

Referring to FIG. 1, there is shown a fluid pressure measuring device 10 having an internal pressure-sensing element, an enlarged head portion of which is indicated at 11 and the main body of which is covered by a protective metal case 12 of cylindrical shape. The pressure sensing element with the case 12 removed is shown in FIG. 2, such pressure-sensing element being generally designated by reference numeral 13. As seen in FIG. 2, the pressure-sensing element 13 includes a reduced size body portion 14 which extends from the enlarged head portion 11. Both the head portion 11 and the body portion 14 are formed from a single piece of metal. Such metal piece is provided with a center passageway 15 which extends through the head portion 11 and into the body portion 14 to a point short of the free end 16 of the body portion 14. The portion of the passageway 15 within the body portion 14 and a shoulder portion 17 is of a cylindrical shape or circular cross section as is indicated in FIG. 3. The remainder of the passageway 15, indicated at 15a, is provided with a slight outwardly flaring taper and is threaded for enabling an appropriate pressure fitting to be threaded into the head portion 11. A typical pressure fitting is indicated at 18 in FIG. 1, such pressure fitting having an appropriate connector nipple 19 threaded into the open end thereof. In use, the nipple 19 is connected to the chamber or vessel or pipe or other structure whose internal fluid pressure is to be measured.

In the assembly of the device 10, the case 12 is slipped over the body portion 14 of the sensing element 13 and is held in place by means of setscrews, one of which is indicated at 20, which setscrews engage the shoulder 17 on the head portion 11. Electrical connections to certain transducer elements located on the pressure-sensing element 13 are made by way of a multipin female electrical connector 21 which is mounted on the case 12 at the right-hand end thereof as viewed in FIG. 1.

Referring to FIGS. 2 and 3 and considering in greater detail the construction of the body portion 14 of the pressure-sensing element 13, such body portion 14 is of a relatively rigid blocklike form. It includes two flat parallel sides 22 and 23 lying parallel to the center axis of the passageway 15. The body portion 14 further includes two curved sides 24 and 25 interconnecting the two flat sides 22 and 23. These curved sides 24 and 25 have a common axis of revolution or center of radius of curvature, which axis or center coincides with the center axis of the passageway 15. The dimension W of FIG. 2 denotes the transverse width of the body portion 14 parallel to the flat sides 22 and 23. The dimension L denotes the length of the body portion 14 in the direction of the center axis of the passageway 15. The dimension H denotes the length of the portion of the passageway 15 (hole length) within the body portion 14. The dimension T of FIG. 3 denotes the thickness of the body portion 14 between the two flat sides 22 and 23.

The relative proportioning of various ones of these dimensions of the body portion 14 are of critical importance if optimum performance of the pressure measuring device is to be realized. For satisfactory performance of the pressure measuring device 10, the width W should be slightly greater than twice the thickness T and the hole length or hole depth H should be slightly less than twice the thickness T. For optimum performance, the relative relationships be between these dimensions should be as follows:

$$W = 2.051T \pm 0.005 \quad (1)$$
$$H = 1.923T \pm 0.005 \quad (2)$$
$$W = 1.067H \pm 0.005 \quad (3)$$

Though not so critical, the length L is preferably not less than 1.25H.

Fastened to the flat sides 22 and 23 of the body portion 14 are transducer elements represented by resistance strain gages 26, 27, 28 and 29. Strain gage 27 is on the rearward flat side 23 directly opposite the strain gage 26. Strain gage 29 is on the rearward flat side 23 directly opposite the strain gage 28. Strain gages 26–29 are preferably of the semiconductor type wherein the strain sensing element is a silicon ribbon.

Strain gages 26 and 27 are bonded to their respective flat sides 22 and 23 at locations above the center passageway 15 and are oriented for measuring the strain in a plane transverse to or perpendicular to the center axis of the passageway 15. These strain gages 26 and 27 will hereinbefore be referred to as "transverse" strain gages. Preferably, these transverse strain gages 26 and 27 are centered at approximately the midpoint along the length of the passageway 15 located within the body portion 14. More precisely, they are preferably centered at a point midway between the should 17 and the point at which the passageway 15 starts to taper inwardly.

The other two strain gages 28 and 29 are likewise bonded to their respective flat sides 22 and 23 but are instead oriented for measuring the strain in a plane parallel to the center axis of the passageway 15. These strain gages 28 and 29 will hereinafter be referred to as "axial" strain gages. These other strain gages 28 and 29 are located on the body portion 14 adjacent the transverse gages 26 and 27 but nearer the closed end of the center passageway 15 than the gages 26 and 27. As will be seen, these axial strain gages 28 and 29 are centered at points which, for reasons to be explained, do not experience any substantial net axial strain gages 28 and 29 are centered at points which, for reasons to be explained, do not experience any substantial net axial strain or deformation.

Referring now to FIG. 4, there is shown the manner in which the strain gages 26–29 are electrically interconnected to one another. More particularly, as there shown, the four strain gages 26–29 are individually connected into different ones of the four arms of a Wheatstone bridge 30. Strain gages 26–29 are carefully chosen so that their resistance characteristics accurately match one another. As a consequence, bridge 30 is in a balanced condition when no pressurized fluid is present in the passageway 15. The elements located within the dash line box of FIG. 4 are located inside the protective case 12 of FIG. 1. In use, a battery 31 or other appropriate voltage source is connected across one diagonal of the bridge 30, while a meter 32 or other appropriate indicating or recording device is connected across the other diagonal of the bridge 30, these connections being made by way of the pins in the connector 21 of FIG. 1. If a continuous record is desired, a moving chart type recorder can be used in place of the meter 32.

OPERATION OF THE PREFERRED EMBODIMENT

In use, the connector nipple 19, or other appropriate fitting which may be used in place thereof, is connected to an appropriate port in the chamber, vessel, pipe or other structure containing the fluid whose pressure is to be measured. This admits the pressurized fluid to the interior of the passageway 15. The battery 31 and meter 32 are connected to the Wheatstone bridge 30 inside the case 12 by way of the connector 21. The meter 32 then provides a reading which is proportional to the fluid pressure within the passageway 15. Pressurized fluid in the passageway 15 causes both axial and transverse deformation of the body portion 14. Because of the particular shape factor of the body portion 14, the transverse deformation is more in the nature of a bulging out of the flat sides 22 and 23 in the areas overlying the passageway 15. This bulging varies the resistance values of the transverse strain gages 26 and 27. This, in turn, unbalances the bridge 30 and supplies a voltage signal to the meter 32 which is proportional to the fluid pressure.

The axial strain gages 28 and 29 are located at positions on the flat sides 22 and 23 which suffer no substantial net axial deformation even through a substantial fluid pressure may exist within the passageway 15. The reason for this is that the bulging out of the flat sides at these locations causes an axial contraction which offsets and cancels out the axial elongation which would otherwise occur as a result of the fluid pressure in the passageway 15. Provided the strains are kept within the elastic limits of the material, the axial deformation caused by the transverse deformation is related to such transverse deformation by a constant which is known as Poisson's ratio. According to Poisson's ratio, the unit axial contraction (assuming no external axial stress) is proportional to the unit transverse elongation. Thus, by proper proportioning of the axial and transverse dimensions, the axial contraction which tends to occur at a given location on the flat sides can be made to offset the axial elongation which also tends to occur.

In view of the fact that the axial gages 28 and 29 are locates at zero axial stress points, the resistance values of these gages 28 and 29 are not affected by pressure within the passageway 15. As a consequence, they can be used to provide a desired temperature compensation for the pressure measuring device 10. More particularly, if the temperature of the body portion 14 at the location of the transverse gage 26 changes, then the resistance of the gage 26 also changes. However, because the axial gage 28 is on the same piece of metal as is the transverse gage 26 and is in close proximity thereto, its temperature and, hence, its resistance changes in a substantially identical manner. As a consequence, no unbalanced component is introduced into the bridge circuit 30 as a result of such temperature change. The same considerations apply for the other two strain gages 27 and 29 located on the other side of the body portion 14. The fact that the resistances of the temperature compensating gages 28 and 29 vary only with temperature and not with pressure considerably increases the overall sensitivity and linearity of the bridge circuit 30, while providing the desired temperature compensation.

Various embodiments of the pressure-sensing element 13 have been constructed having different sets of dimensions for the body portion 14. Tests on these embodiments indicate that the relative dimensions of the body portion 14 are fairly critical in order to obtain the desired region of zero axial stress on the flat sides 22 and 23. The necessary relationships between the dimensions to accomplish this purpose have been set forth above. As there indicated, these relationships are relative. The actual dimensions of body portion 14 may assume different values, provided the relative proportioning between dimensions is maintained. Thus, within limits, the various dimensions may be increased or decreased, provided that all of the dimensions are changed by the same factor.

While it is not intended to limit the invention to any particular set of actual dimensions, the following values have been found to provide a fluid pressure measuring device which exhibits the desired characteristics:

| | |
|---|---|
| Length (L) | 1.000 inches |
| Width (W) | 0.800 inches |
| Thickness (T) | 0.390 inches |
| Radius of curved sides | 0.400 inches |
| Hole Depth (H) | 0.750 inches |

Tests on a device 10 having a pressure-sensing element 13 constructed of stainless steel and having these specific dimensions have shown the overall device 10, including the Wheatstone bridge 30, to have a linearity such that the pressure verses output voltage calibration curve departs from a straight line by less than 0.25 percent of the full scale pressure value. These tests have further s shown that the device 10 has a thermal sensitivity of less than 0.01 percent full scale per degree Fahrenheit within a temperature range of 15° to 115° F. The thermal zero drift was found to be less than 0.005 percent full scale per degree Fahrenheit within the same temperature range.

It was also found that the pressure-measuring device 10 would withstand an overload of twice the full scale pressure rating without damage. Thus, a pressure-measuring device constructed in accordance with the present invention is rugged, provides very good linearity and has very good temperature stability characteristics. Such pressure-measuring devices are also particularly suitable for measuring relatively high pressures. In particular, pressures of 20,000 pounds per square inch or more are readily accommodated.

One further factor that need be considered is the diameter of that portion of the passageway 15 which is within the body portion 14. It has been found that the diameter of this portion of the passageway 15 affects the sensitivity of the device 10 but does not affect either the linearity or the temperature stability of the device 10. The following table shows the bridge output voltages obtained for different diameter values for the passageway 15 for the case of a pressure-sensing element 13 constructed of stainless steel and having the above-indicated exterior dimensions:

| Hole diameter (inches) | Pressure (p.s.i.) | Output volts (millivolts) |
|---|---|---|
| 18/64 | 3000 | 150 |
| 19/64 | 3000 | 172 |
| 20/64 | 3000 | 245 |
| 21/64 | 3000 | 314 |

Thus, increasing the hole diameter, increases the value of the bridge output voltage for a given value of fluid pressure. The hole diameter is selected, therefore, to provide the desired full scale output voltage for the desired full scale pressure value.

As indicated, the foregoing data was obtained for the case of a pressure-sensing element 13 made of stainless steel. It is to be understood, however, that other metals can instead be used. For example, a pressure-sensing element 13 made of aluminum has been constructed and tested and found to perform satisfactorily. For the same exterior dimensions as given and with a hole diameter of 20/64 of an inch and a fluid pressure of 1,500 pounds per square inch, the aluminum element was found to produce a bridge output voltage of 300 millivolts. Thus, the aluminum element is somewhat more sensitive in terms of volts per unit pressure than is the stainless steel element.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A fluid pressure measuring device comprising:
   a metal piece having a body portion having a center passageway of cylindrical shape extending from one end thereof to a point short of the opposite end thereof, such body portion having two flat parallel sides lying parallel to the center axis of the passageway;
   a first strain gage bonded to one of the flat sides above the passageway for measuring the strain in a plane transverse to the center axis of the passageway;
   a second strain gage bonded to one of the flat sides above the passageway for measuring the strain in a plane parallel to the center axis of the passageway;
   and circuit means for enabling the strain gages to be connected in circuit with one another whereby the first strain gage may provided an indication of fluid pressure within the passageway and the second strain gage may provide temperature compensation for the device.

2. A fluid pressure measuring device comprising:
   a metal piece having a body portion having a center passageway extending from one end thereof to a point short of the opposite end thereof, such body portion having two flat parallel sides lying parallel to the center axis of the passageway and two curved sides interconnecting the two flat sides, such curved sides having a common axis of revolution which coincides with the center axis of the passageway;
   a first strain gage bonded to one of the flat sides above the passageway for measuring the strain in a plane transverse to the center axis of the passageway;
   and circuit means for enabling the strain gages to be connected in circuit with one another whereby the first strain gage may provide an indication of fluid pressure within the passageway and the second strain gage may provide temperature compensation for the device.

3. A fluid pressure measuring device comprising:
   a metal piece having a body portion having a center passageway extending from one end thereof to a point short of the opposite end thereof, such body portion having two flat parallel sides lying parallel to the center axis of the passageway;
   a first strain gage bonded to one of the flat sides above the passageway for measuring the strain in a plane transverse to the center axis of the passageway;
   a second strain gage bonded to one of the flat sides above the passageway and centered at a point where direct axial deformation of the body portion caused by fluid pressure within the passageway is offset by the opposing axial deformation resulting from the transverse deformation caused by fluid pressure within the passageway for measuring the strain in a plane parallel to the center axis of the passageway;
   and circuit means for enabling the strain gages to be connected in circuit with one another whereby the first strain gage may provide an indication of fluid pressures within the passageway and the second strain gage may provide temperature compensation for the device.

4. A fluid pressure measuring device comprising:
   a relatively rigid metal piece having an enlarged head portion at one end thereof, a reduced body portion extending from the head portion, and a center passageway extending through the head portion and into the body portion to a point short of the free end of the body portion, the portion of such passageway within the body portion being of cylindrical shape, such body portion having two flat parallel sides lying parallel to the center axis of the passageway and two curved sides interconnecting the two flat sides, such curved sides having a common axis of revolution which coincides with the center axis of the passageway, the width of the body portion transverse to the passageway and parallel to the flat sides being equal to approximately twice the thickness of the body portion between the flat sides and the passageway length within the body portion being equal to approximately twice the thickness of the body portion between the flat sides;
   a first pair of semiconductor strain gages individually bonded to different ones of the two flat sides above the passageway, each being centered at approximately the midpoint along the passageway length within the body portion and oriented for measuring the strain in a plane transverse to the center axis of the passageway;
   a second pair of semiconductor strain gages individually bonded to different ones of the two flat sides above the passageway and located nearer the closed end of the passageway than the first pair of strain gages and oriented for measuring the strain in a plane parallel to the center axis of the passageway;
   and circuit means for individually connecting the four strain gages into different ones of the four arms of a Wheatstone bridge whereby the first pair of strain gages causes the bridge to provide an indication of the fluid pressure within the passageway and the second pair of strain gages provides temperature compensation for the bridge.

* * * * *

UNITED STATES PATENT OFFICE
CERTIFICATE OF CORRECTION

Patent No. 3,645,136　　　　Dated February 29, 1972

Inventor(s) CHARLES W. CALHOUN

It is certified that error appears in the above-identified patent and that said Letters Patent are hereby corrected as shown below:

Column 1, line 37, after "thereof" insert --to a point short of the opposite end thereof--.

Column 3, line 2, change "hereinbefore" to --hereinafter--.

Column 3, line 7, before "17" change "should" to --shoulder--.

Column 3, line 19, after "strain" cancel "gages 28 and 29 are centered at points which for reasons to be explained, do not experience any substantial net axial strain".

Column 4, line 5, change "locates" to -- located --.

Column 4, line 56, after "further" cancel "s".

Column 5, line 54, change "provided" to --provide--.

Signed and sealed this 18th day of July 1972.

(SEAL)
Attest:

EDWARD M. FLETCHER, JR.
Attesting Officer

ROBERT GOTTSCHALK
Commissioner of Patents